Figure 1:
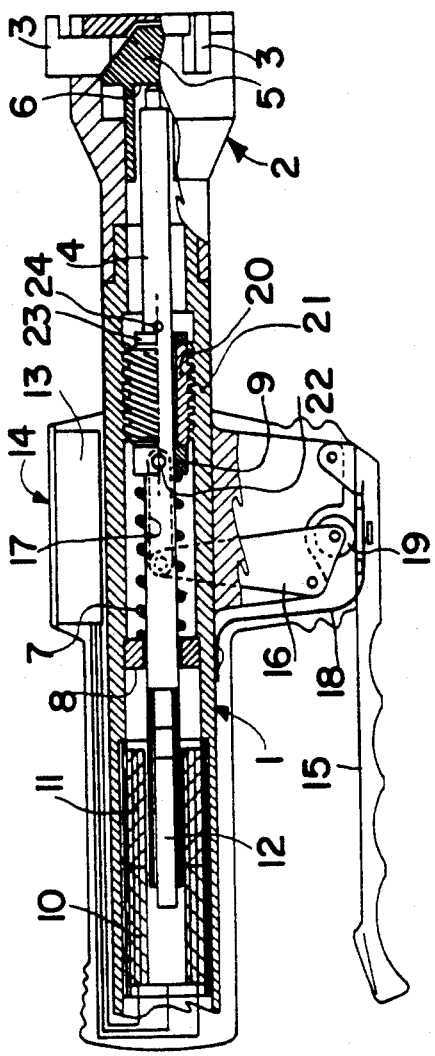

United States Patent [19]

Ginggen et al.

[11] Patent Number: 5,189,796
[45] Date of Patent: Mar. 2, 1993

[54] SHOCK-RESISTANT DEVICE FOR A MEASURING MACHINE

[75] Inventors: Serge Ginggen, Chavannes; Jean-Marc Frauenknecht, Bussigny-prés-Lausanne, both of Switzerland

[73] Assignee: Tesa S.A., Switzerland

[21] Appl. No.: 690,008

[22] Filed: Apr. 23, 1991

[30] Foreign Application Priority Data

May 18, 1990 [CH] Switzerland ............... 01692/90

[51] Int. Cl.$^5$ .................................. G01B 3/22
[52] U.S. Cl. ........................... 33/556; 33/DIG. 6
[58] Field of Search ................ 33/DIG. 6, 556, 557, 33/558, 559, 544.3, 544, 546, 558, 501.05, 501.07, 501.08, 501.5

[56] References Cited

U.S. PATENT DOCUMENTS

| | | | |
|---|---|---|---|
| 2,663,945 | 12/1953 | Emery | 33/DIG. 6 |
| 2,900,733 | 8/1959 | Zeluick | 33/556 |
| 3,835,544 | 9/1974 | Schneider | 33/DIG. 6 |
| 4,010,548 | 3/1977 | Iwasaki | 33/DIG. 6 |
| 4,389,784 | 6/1983 | Zanier | 33/559 |

Primary Examiner—William A. Cuchlinski, Jr.
Assistant Examiner—William C. Dowling
Attorney, Agent, or Firm—Anthony J. Casella; Gerald E. Hespos

[57] ABSTRACT

The device, shown associated with a bore measuring machine, comprises two elements in engagement in the form of a bolt (20) and a nut (21) of reversible relative axial rotation and displacement. The bolt (20) is a threaded cylindrical sleeve mounted coaxial to the measurement rod (4) of the machine and with free rotation between two stops (9, 23) thereof, and the nut (21) is formed by an inner thread on the cylindrical body (1) of the machine. The force of friction developed by the relative bolt-nut rotation is adapted to yield to at least the pressure of the return spring (7) of the measurement rod and to constitute a brake for modulating the speed of the displacements in both directions of the measurement rod (4) in the body of the machine.

6 Claims, 1 Drawing Sheet

SHOCK-RESISTANT DEVICE FOR A MEASURING MACHINE

The object of the present invention is a shock-resistant device for a measuring machine such as a comparator, a caliper, a gauge, a column or a mortise gauge, of a type comprising a body, a measurement rod moveable in the body and at least one measurement probe connected to the measurement rod and intended to contact an element of part to be measured under the pressure of a return spring.

Most measuring machines of this type are equipped with a shock-resistant device intended to protect the fragile mechanical bodies of their measurement chain from impacts caused by falls or errors in handling, resulting for instance, in the sudden arrival of the measurement rod at the end of its stroke, violent jerky displacement, or else application at excessive speed of the measurement probe or probes against the surface of a part to be measured.

The known shock-resistant devices are of types which differ in design, but, however, have in common the characteristic of employing a shock-absorbing unit, mostly of spring type, interposed between two parts of a mechanical member of the measurement chain, in such a manner as to permit their temporary elastic separation under the effect of a shock which, without this, might cause the breaking of a fragile body such as, for instance, a gear of the step-up transmission mechanism of a dial comparator.

In certain machines for the measurement of bores equipped with a measurement head with radial probes and a measurement rod which is directly connected to an electronic transducer, the radial probes are retracted to a minimal diameter by means of a trigger so as to permit them to be inserted in a bore which is to be measured, against a return spring which provides the measurement pressure. After introduction of a measurement head into the bore, the release of the trigger frees the radial probes which, under the action of the return spring, move apart until coming against the wall of the bore, whereupon the measurement is taken. Upon the release of the trigger of these machines, the measurement probes under the action of the return spring can enter into more or less sudden contact with the wall of the bore depending on the rapidity of the release effected by the operator. This sudden contact may be damaging both to the mechanical radial displacement system to the measurement probes and to the wall of the bore to be measured, in particular when said wall is of a hardness which is definitely less than that of the measurement probes. This is a special problem, therefore, which must be solved in the case of this type of bore measuring machine.

In the known spring-type shock-absorbing units used essentially in machines the measurement chain of which is purely mechanical, the springs are of different types depending on the size of the damping stroke provided and on whether there is concerned damping in a single direction of displacement of the measurement rod, or in both directions.

In the one case there is used a coil spring having a long stroke in a single direction of displacement, as in the comparator described in Federal Republic of Germany Patent 1253465 and, in the other case, a pair of leaf springs of small stroke in both directions of displacement, as in the comparator described in U.S. Pat. No. 3,835,544.

These spring shock-absorbing systems, in addition to their greater or lesser complexity depending on their type, all have the major drawback of producing the temporary interruption, in case of sudden impact, of the continuity of the measurement chain due to the fact that they operate by separation of two elements of said chain, this interruption having the effect of bringing up problems of repetition or precise return to the measurement zero.

In fact, by the repeated impacts between the stops of the two elements which are, in succession, disconnected by the shocks and then again brought, more or less suddenly, back against each other by the spring of the shock-absorbing unit, wear or deformations which are difficult to detect on the spot may occur, or else particles of matter may even come between the stops, such as, for instance, dust or rust resulting from corrosion.

Furthermore, these spring shock-absorbing systems do not have a linear function, and the shock-absorbing stroke which they permit nevertheless remains rather small in the best of cases as compared with the stroke of which the measurement rod is capable.

With respect to this drawback of limitation of the shock-absorbing stroke, a measuring machine is however known, described in U.S. Pat. 4,010,548, which is not affected thereby. In this machine, in fact, the shock-absorbing unit is no longer formed of an elastic spring system, but by a frictional coupling system interspersed between two coaxial toothed pinions, the frictional force being adapted to withstand the action of the return spring which supplies the measurement pressure and to yield upon impacts which might result in the breaking of one or more fragile elements of the measurement chain. As a result, the shock-absorbing stroke is limited here only by the stroke itself of the measurement rod of the instrument. However, the major drawback, namely the temporary interruption of the measurement chain, is still present in this machine and the repetition and measurement zero are even less reliable due to the absence of terminals or support stops between friction members.

The present invention is directed at solving the problems raised by the aforementioned known shock-resistant devices, as well as those raised by electronic transducer measuring machines of the type previously mentioned.

For this purpose, the shock-resistant device of the invention is characterized by the fact that it is formed of two elements in engagement, in the form of a bolt and a nut of reversible relative rotation and axial displacement, one of which is connected to the body of the instrument and is fixed at least axially with respect to it, while the other is connected to the measurement rod of the instrument for displacement and axial drive by the latter, a single one of said two elements being moveable in rotation with respect to the body to which it is fastened and the frictional force developed by the relative rotation of these two elements in engagement, upon the displacement of the measurement rod within the body, being determined so as to yield at least to the pressure of the return spring of the measuring machine.

In this way, the shock-resistant effect is obtained here by a modulated braking of the displacements of the measurement rod, having the effect of limiting their speed to a value which will not result in damage, both in the direction opposite the action of the return spring and in the direction of said action, and this without requiring the interruption of the measurement chain due to the fact that the two elements, the bolt and the nut, are associated one with the body and the other with the measurement rod of the instrument, and not interposed between two parts or two elements of the measurement chain.

Stated differently, the shock-resistant device developed in this manner is outside the circuit of the measurement chain of the instrument and therefore has no influence on it, and in particular on the repetition and constancy of the measurement zero.

Furthermore, the length of the shock-absorbing stroke is limited, for all practical purposes, only by the possible stroke, between stops, of the measurement rod of the instrument due to the design itself of the device.

This device is simple and inexpensive to manufacture in view of the fact that, being outside the circuit of the measurement chain, its manufacture does not require a high degree of precision.

The modulation of the braking effect obtained by the relative friction of the two elements in engagement is simple, since the parameters which determine it are easy to control and, for all practical purposes, do not change with time since this system suffers only minor fatigue, by rubbing on surfaces which are relatively large as compared with the pressures suffered.

One or the other of the two elements, bolt or nut of the device, can be connected to the body or measurement rod of the instrument, which confers upon said device versatile qualities which facilitate its application to practically all types of measurement instruments having a measurement rod which is moveable in their body.

The accompanying drawing shows, by way of example, three embodiments of the object of the invention.

Figure 3:
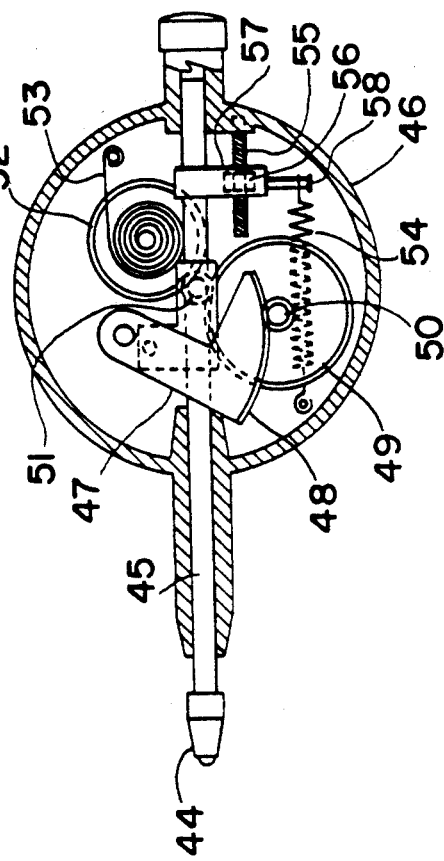
Figure 2:
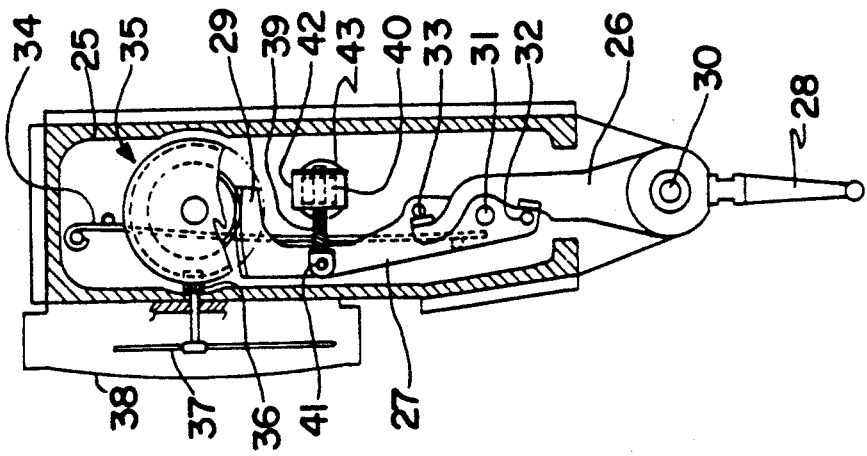

FIGS. 1, 2 and 3 of the drawing show diagrammatically the first, second and third embodiments, respectively, of this object, shown associated with three different types of measuring machines.

The shock-resistant device shown in FIG. 1 in its first embodiment is shown associated with a bore measuring machine comprising:

a body 1 with measurement head 2 comprising three radial probes 3, 120° apart, only two of which are visible;

a measurement rod 4 mounted for axial movement within the body 1;

a mechanism for the radial displacement of the probes 3 by means of a truncated moveable stop 5 on the conical surface of which the oblique base of each of the probes 3 rests via a spring means, not shown, and against the bottom 6 of which the measurement rod 4 rests via one of its two ends;

a return spring 7 compressed between a resting face of a bearing 8 which is integral with the body 1 and an axial drive ring 9 of the measurement rod 4 which is integral with the latter, and having the effect, by push of said rod against the truncated stop 5, of moving the radial probes 3 apart to the maximum possible diameter of the measurement head 2, this spring 7 being provided to supply the desired measurement pressure of the said probes against the wall of the measurement bores;

an electronic measurement transducer which in this case is, for instance, of inductive type, comprising two coils 10 and 11 integral with the body 1 and a ferrite core 12 fastened to the end of the measurement rod 4 opposite the probes 3, and in which the ferrite core 12 acts on the impedance of the coils 10 and 11 by its axial displacements to produce an electric signal representative of the diameter measured, this transducer being connected here to a processing circuit 13 having a numerical display 14 indicating the value of the diameter measured;

a device for the retraction of the radial measurement probes 3 in order to retract them to the minimum possible diameter of the measurement head 2, acting against the return spring 7 and comprising a control trigger 15 connected to the measurement rod 4 via two lateral levers 16 articulated to the body 1 and two lateral connecting rods 17, indicating in dashed lines, in their turn articulated, on the one hand, to said levers 16 and, on the other hand, to the two ends of a pin 22 extending through the measurement rod and its drive ring 9. In this latter arrangement, the pin 22 passes through the two lateral openings in the body 1, not visible in the drawing, and is then articulated to the two connecting rods 17 on each side of the body 1, and the trigger 15, held in neutral position by a leaf spring 18 fastened to the body 1, is adapted to be able to actuate the levers 16 by coming against a roller 19 which is mounted for rotation at the end of these levers.

The shock-resistant device of the invention with which this bore measuring machine is provided is formed of two elements 20 and 21 in the form of a bolt and a screw of reversible rotation and axial displacement.

One of these two elements, in this case in the form of a nut 21, is formed by an internal thread on a portion of the tubular wall of the body 1. It should be noted here that this element could consist of a part attached to the body 1.

The other element, in the form of a bolt, is formed by a threaded cylindrical sleeve 20, the threaded outer wall of which is in engagement, in the position of the end of the stroke of the measurement rod 4, over the entire length of the threaded inner section of the body 1 and the inner smooth wall of which is mounted for free rotation around the measurement rod 4. This bolt-shaped element 20 is immobilized here axially on the measurement rod 4 between the ring 9 and a retention washer 23 held in place by a pin 24, in a position located between the return spring 7 and the measurement head 2.

Upon actuation of the trigger 15 prior to the taking of a measurement by the operator, the measurement rod 4 is displaced axially against the return spring 7 by the kinematics of the levers 16 and connecting rods 17, in this case from right to left in the drawing, which has the effect, on the one hand, of axially driving the bolt-shaped element 20 which turns by screwing in the nut-shaped section 21 of the body 1 as a result of its qualities of reversibility, and, on the other hand, of permitting the radial probes 3 to retract by the pushing of the truncated stop 5 against the measurement rod 4 up to the end of the return stroke of the latter, which corresponds to the maximum retraction of said probes in the measurement head 2.

After introduction of the measurement head into the bore to be measured by the operator, the actuating of the trigger 15 releases the tension of the return spring 7 and the latter pushes the measurement rod 4 towards the measurement head 2, which has the effect of moving the measurement probes 3 apart by the push of the truncated stop 5 and of driving the bolt-shaped element 20 axially and rotatably in the direction opposite its previous direction, until the measurement probes 3 encounter the wall of the bore to be measured, after which the measurement is made.

As already stated, the frictional force developed by the relative rotation of the two elements in engagement, the bolt 20 and the nut 21, constitutes a brake which makes it possible to modulate the speed of the axial displacements of the measurement rod 4 in the body 1 of the instrument, so as to avoid damage resulting from sudden impacts or handling.

The amount of this frictional force is determined so as to yield at least to the pressure developed by the return spring 7, in order to provide assurance that the latter returns the measurement probes 3 to their position of maximum deployment.

Based on respect of the condition of reversibility of the bolt-nut system which is defined mathematically by the ratio between the helix angle and the angle of friction of the thread of the threading of the two elements in engagement, which must be greater than unity, the modulation of the braking force to the desired value is obtained by integration of parameters which are simple to handle, such as the number of threads of the threading, their cross section, the average diameter of the threading, the length in engagement, the materials used and, possibly, the presence or absence of lubrication.

The shapes of the bolt and of the nut shown in the drawing are obviously not limitative and all types of combinations are possible, in view of the large number of parameters which one can vary in order to obtain the desired modulation.

It is also possible to differentiate the speed of displacement in one direction from that in the other direction, for instance by imparting the cross section of the threads of the threading of the flanks different inclinations on one side than on the other.

The invention is applicable to practically all measuring machines having a measurement rod which is moveable in their body.

The second and third embodiments which follow illustrate this possibility.

In the second embodiment, shown in FIG. 2, the shock-resistant device is shown associated with a pivoting probe comparator.

In the body 25 of this machine, the measurement rod is formed of two associated levers 26 and 27, one of which, the lower one 26, bears a measurement probe 28 while the other, the upper probe 27, bears a toothed sector 29. These two levers 26 and 27 are held against respective rests by a swing system with articulations 30, 31 and spaced stops and mating stops 32 and 33, the effect of which, under the pressure of the return spring 34, in known manner is to effect the displacement of the upper lever 27 in all cases in the same direction with reference to the position of rest shown in the drawing, whatever the direction of the pivotings of the measurement probe 28.

The toothed sector 29 of the lever 27 acts on a displacement amplifying gear system 35 the output pinion 36 of which drives the pointer 37 of an indicator dial 38.

The shock-resistant device of this pivoting probe comparator 28 comprises a bolt 39 connected to the upper lever 27 of the measurement rod and a nut 40 connected to the body 25 of the machine, these two elements being of reversible relative rotation and axial displacement.

The bolt 39, the longitudinal axis of which is contained within a plane parallel to the pivoting plane of the lever 27, is articulated at one end on a pivot 41 which is integral with said support and engaged at the other end in the nut 24, in the position of rest shown.

On its part, the nut 40 is mounted for rotation in a cage-type bearing 42 having a pivot, not shown, perpendicular to the plane of pivoting of the lever 27 and mounted for rotation in a bearing 43 which is integral with the body 25.

Thus, in this second embodiment of the shock-resistant device, the bolt 39 connected to the lever 27 of the measurement rod is fixed in rotation and moveable axially and the nut 40 is moveable in rotation and fixed axially.

Here the pivotings of the measurement probe 28 and the two levers 26 and 27 of the measurement rod are braked by the shock-resistant device. The frictional force developed must here also be determined by yielding to at least the pressure of the return spring 34 in order to permit the return of the system into position of rest. Moreover, this frictional force is in this case a constant, since the entire threading of the nut 40 is always engaged by the bolt along the course of pivoting of the lever 27 of the measurement rod.

In the third embodiment, shown in FIG. 3, the shock-resistant device is shown associated with a dial comparator comprising a measurement probe 44 mounted on the end of a measurement rod 45 which is moveable axially in the body 46 of said instrument.

The axial displacements of the measurement rod 45 are transmitted, via a lever 47 with toothed sector 48, to a displacement step-up gear train 49, 50, 51, the output pinion 51 of which drives the pointer of the indicating dial (not shown). An additional toothed wheel 52 to take up play meshes with the output pinion 51 under the tension of a coil spring 53 mounted on its shaft, against a return spring 54 of the measurement rod 45, the relative position of the members being shown here as substantially at the mid-course of this rod.

The shock-resistant device of this comparator comprises a bolt 55 connected to the body 46, in a position parallel to the measurement rod 45, and a nut 56 connected to the measurement rod, these two elements being in engagement. The bolt 55, which is fixed in rotation and axially, is fixed rigidly at one end in the wall of the body 46, while the nut 56 is mounted movably in rotation in a cage-type bearing 57 fastened to the measurement rod 45, the return spring 54 being in this case hooked to a rod 58 which is fastened to said bearing.

Based on the three embodiments described, which however are not limitative, it would appear obvious that all combinations between them can be utilized for easy adaptation to practically all types of measuring machines of the kind comprising a measurement rod mounted moveably in their body, and this whatever the nature of this mobility, be it translation or rotation, and whatever the length of its stroke, since the device has the same efficiency on small and long lengths of engagement between bolt and nut.

The ratio of the lengths between the bolt and the nut can also vary as desired, in accordance with the space available, the measurement stroke and the modulation desired.

We claim:

1. A shock-resistant device for a measuring machine comprising a body, a measurement rod movable within the body and at least one measurement probe connected to the measurement rod and intended to contact an element of a part to be measured under the pressure of a return spring, characterized by the fact that it is composed of two members in engagement, in the form of a bolt and a nut with reversible relative rotation and axial displacement, one of which (21, 40, 55) is fastened to the body (1, 25, 46) of the instrument and is immoveable at least axially with respect to it, while the other (20, 39, 56) is connected to the measurement rod (4, 27, 45) of the instrument so as to be displaced and driven axially by the latter, a single one of these two elements being moveable in rotation with respect to the body to which it is attached and the frictional force developed by the relative rotation of these two elements in engagement, upon displacement of the measurement rod within the body, being so determined as to yield at least to the pressure of the return spring (7, 34, 54) of the measurement machine.

2. A device according to claim 1, characterized by the fact that the element in the form of a bolt (20, 39) is connected to the measurement rod.

3. A device according to claim 1, characterized by the fact that the element in the form of a bolt (55) is connected to the body.

4. A device according to claim 2 for a machine with axially moveable measurement rod (4, FIG. 1), characterized by the fact that the element in the form of a bolt is a threaded sleeve (20) which is coaxial to the measurement rod (4) and mounted for free rotation between two stops (9, 23) on said rod, and by the fact that the element in the form of a nut (21) is formed by an internal thread on the body (1) of the measuring machine.

5. A device according to claim 2 for a machine with pivoting measurement rod (26-27, FIG. 2), characterized by the fact that the element in the form of a bolt (39) is contained in a plane parallel to the pivot plane of the measurement rod and articulated at one end on a pivot (41) which is integral with said rod, and by the fact that the element in the form of a nut (40) is mounted for free rotation in a cage-type bearing (42) bearing a pivot perpendicular to the plane of pivot of the measurement rod and is rotatably mounted in a bearing (43) which is integral with the body (25) of the machine.

6. A device according to claim 3 for a machine with axially moveable measurement rod (45, FIG. 3), characterized by the fact that the element in the form of a bolt (55) is fastened rigidly at one end to the body (46) of the instrument in a position parallel to the measurement rod, and by the fact that the element in the form of a nut (56) is mounted for free rotation in a cage-type bearing (57) fastened to said measurement rod.

* * * * *